(No Model.) 2 Sheets—Sheet 1.

G. R. ELLIOTT.
LIFTING JACK.

No. 265,042. Patented Sept. 26, 1882.

Witnesses:
Thomas E. Clary
Milton Clark

Inventor
Gilbert R. Elliott (No Model.)  2 Sheets—Sheet 2.

G. R. ELLIOTT.
LIFTING JACK.

No. 265,042. Patented Sept. 26, 1882.

Witnesses
Thomas E. Clary
Milton Clark

Inventor
Gilbert R. Elliott

UNITED STATES PATENT OFFICE.

GILBERT R. ELLIOTT, OF MONCTON, NEW BRUNSWICK, CANADA, ASSIGNOR OF FIVE-EIGHTHS TO THOMAS E. CLARY, OF NORWOOD, MASS.

LIFTING-JACK.

SPECIFICATION forming part of Letters Patent No. 265,042, dated September 26, 1882.

Application filed April 7, 1882. (No model.)

*To all whom it may concern:*

Be it known that I, GILBERT R. ELLIOTT, a subject of the Queen of Great Britain, residing at Moncton, in the county of Westmoreland and Province of New Brunswick, Dominion of Canada, have invented certain new and useful Improvements in Lifting-Jacks; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention has relation to lifting-jacks, or to that class of inventions known as "screw-jacks;" and it has for its object to greatly increase the lifting-power of the same to such a degree that the power of the ordinary screw-jack is of only secondary consideration.

To this end it consists in a new means of compound leverage operated by frictional and eccentric bearings in such manner that the weight is transferred from the usual bearing-nuts to a double cam or eccentric bearings, and so held by them that either one of the two nuts is alternately turned in the opposite direction to which the weight is being lifted, so that when the cams are relieved the weight is in turn borne by the nuts, they in the meantime being shifted to the distance to which the cams raised the weight, so that at each up and down stroke of the lever either one or the other of the nuts is partially turned, and so on continuously until the weight is raised to its proper level.

It further consists in details of construction and in certain combinations of parts, as will hereinafter more fully appear.

Figure 2:
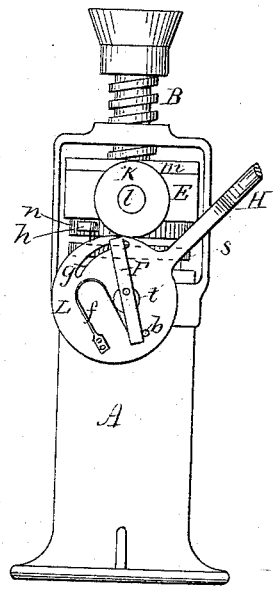
Figure 3:
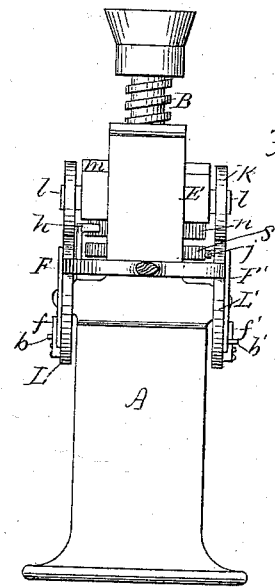
Figure 1:
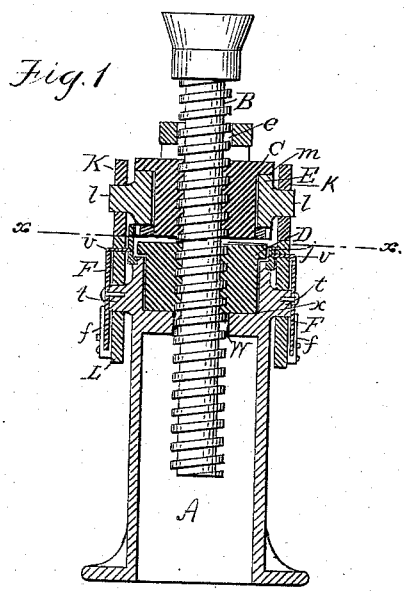
Figure 5:
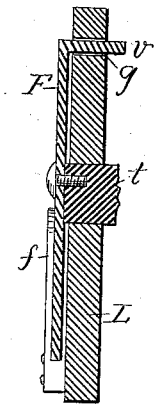
Figure 4:
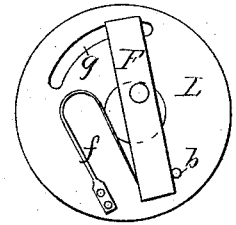
Figure 6:
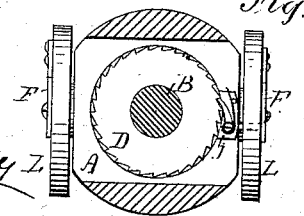
Figure 7:
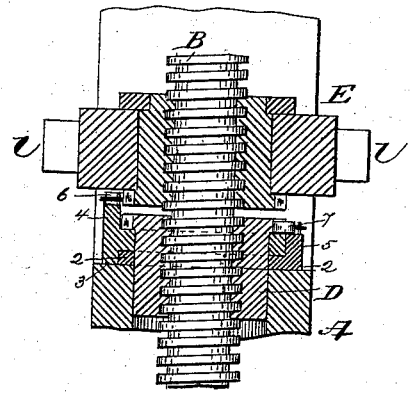
Figure 8:
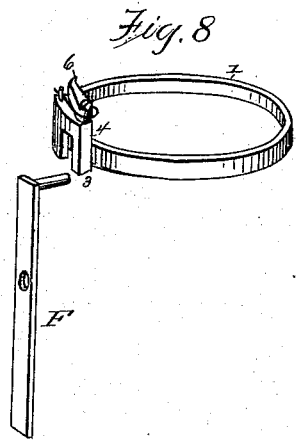
Figure 9:
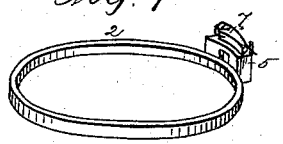
Figure 10:
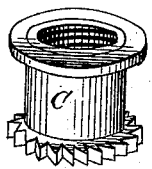

Referring to the accompanying drawings, and to the letters of reference marked thereon, Figure 1 illustrates a central vertical section; Fig. 2, a side elevation; Fig. 3, a front elevation, showing an edge view of the cams and end view of the shifting-pin *v*. Fig. 4 is a side view of the cam or eccentric, showing the springs and levers; and Fig. 5 shows a vertical cross-section of the cam or eccentric and the position of the pin F *v*. Fig. 6 is a transverse section on the line *x x*, Fig. 1, showing a top plan view of the nut D, the friction-cams L L, and the ratchet-spring *j*. Fig. 7 is an enlarged vertical sectional view of the working parts of the jack. Fig. 8 is a plan and detached view, in perspective, of one of the operating-rings carrying the clutch-box and the pawl and spring, and detached therefrom are shown the lever F and the pin which operate in said clutch by which the ratchet-wheel is partially rotated. Fig. 9 represents the corresponding lower ring which performs the function of rotating the lower ratchet-nut. This nut also carries a clutch-pawl and spring similar to that shown by Fig. 8, and precisely for the same purpose; and Fig. 10 represents a perspective view of my improved and novel lifting-nut. It will be observed that this nut is adapted to perform three different absolute and distinct functions—*i. e.*, the entire weight rests upon the collar of this nut at one portion of the revolution of the screw when the cams are released, it takes up the slack when the cams raise the load, and it is adapted to be turned by means of its ratchet-wheel portion by the independent ring-clutch and pawl. Hence it becomes an important factor in the operation of the lifting-jack.

The same letters indicate like parts in all the figures.

A shows the stand of the lifting-jack, provided in its upper portion with an annular bearing and a central aperture for the guidance of the screw or lifting-bar B. This lifting-bar B is screw-threaded its entire length.

C and D are female screw-nuts, which snugly fit the lifting-bar B and engage in the screw-thread on the same.

X is the seat of the lower nut, D, when sustaining the load. This seat is part of the frame, and is cast with it.

E is a case surrounding the nut C, and on which journals are formed for the rollers K to work upon.

*m* is a collar formed on the nut C, and which rests on the case E, so that when the case E is lifted by means of the cams it must necessarily lift the nut C, screw lifting-bar B, and nut D and other mechanism.

*n* and *s* are ratchet or pawl toothed wheels, rigidly fastened to nuts C and D, by means of which said nuts are alternately turned, and which form one of the important features of my invention.

The aperture W in the seat X and the aperture e in the neck are guide-bearings for retaining the lifting-bar B in a true line with the position of the jack.

l l are gudgeons or journals made on the annular ring or case E, upon which the friction-rollers K K revolve. These wheels are fastened by any suitable means.

t t are gudgeons or journals cast with or rigidly fastened and projecting from the side of stand A, and are designed for the cams or eccentric-wheels L L to work on.

j and h are pawls which act upon the ratchet or pawl wheels n and s, which are rigidly fixed to nuts C and D. j acts upon and controls the lower nut, D, and h the upper nut, C. These pawls act upon the nuts in such manner that they are alternately and partially turned at each stroke, but always in the same direction. Said pawls j and h move the nuts C and D by means of the pins v v, which are attached to the spring-levers F F'. The spring-levers F F' are fulcrumed on suitable bearings on the gudgeons t t.

f f' are springs fixed to the cam-wheels L L, whose tension, acting upon the levers F F', tends to drive or move them in one direction when the cams L L are moved.

b b' are pins in the cam-wheels L L, which engage with the levers F F' and move them in the opposite direction to the movement given them by the springs f f' when the cams L L are moved in the opposite direction.

g g' are slots in the cam-wheels L L, and admit of the pins v v' of the levers F F' passing through said cam-wheels so as to engage with the pawls j h.

H is a forked or bifurcated handle, which connects the two cam-wheels L L, and at the same time acts as the lever to operate the mechanism, which by its upward and downward movement partially turns one or the other toothed or pawl wheel, thus partially turning the nuts.

The operation of the mechanism of the lifting-jack is as follows: When the handle or lever H is depressed the cams L L are moved upon their gudgeons or journals t t, thereby raising the friction-rollers K K, case E, nuts C and D, and lifting-screw bar B. The spring f' also comes in contact with the lever F', thereby causing it to move upon its fulcrum, and consequently the pin v' moves the pawl j, which is engaged in the teeth of the wheel s, attached to the lower nut, D. The nut D is therefore revolved about the lifting-bar B in a downward direction until it seats itself upon the seat X. The lifting-bar by this means is retained in the position it has been raised to by the cams L L. While the foregoing is going on the pawl h, with its attachments for acting upon the upper nut, C, is going through the following operation: As the handle or lever H is depressed, the pin b, coming in contact with the lever F, causes it to move about its fulcrum. Consequently the pin v, acting upon the pawl h, moves it in the opposite direction to pawl j. Said pawl h does not engage with the teeth of the pawl-wheel s, but slips over them, and will not engage with the teeth of said pawl-wheel s until the cams L L are moved upward or in an opposite direction to that just described. When the handle or lever H is lifted upward the cams L L are caused to move in the opposite direction to that described above. The weight of the lifting-bar B will consequently be sustained by the lower nut, D, resting upon its seat x, and the weight of the lifting-bar B will be removed from the case E and nut C. The nut C is now in turn rotated about the lifting-bar B in a downward direction by the action of the pawl h, engaging with the teeth of the pawl-wheel s. Thus the nuts C and D alternately sustain the weight of the lifting-bar B, and also alternately move around the lifting-bar B in a downward direction, the nuts C and D being each turned in turn by the action of the springs f f' and intervening mechanism. The peculiar action of the springs f f' in forcing or turning the nuts C D around the lifting-bar is an important feature of this invention. In order to lower the lifting-screw bar, it is rotated and lowered in the nuts C D, as in any ordinary jack-screw.

It is evident that any equivalents of the means shown for turning the nuts could be substituted for the pawl-and-ratchet wheels, and also for the cam-wheels, for relieving the load of the nuts C and D. I do not therefore desire to be confined to the exact form and arrangement shown, as modifications within wide limits may be made without departing from the spirit of my invention. Therefore, Having described the means at present preferable to me, what I claim as new, and desire to secure by Letters Patent, is—

1. The combination, in a lifting-jack, of the central lifting-bar, the screw-nuts adapted to rotate alternately around said bar, whereby the bar is partially raised by each alternate turn, in the manner shown and described.

2. The combination, in a lifting-jack, of the central screw-bar screw-nuts C D, adapted for alternate rotation, by which the said bar is raised by each partial rotation of the nuts and the line-guides e w, whereby the screw-bar is retained centrally in position, for the purpose set forth and shown.

3. In a lifting-jack, the combination of the central screw-bar, the nuts C and D, adapted for alternate rotation, the pin v, and springs f f', in the manner shown and described.

4. In a lifting-jack, the combination of the central screw-bar, the upper and lower nuts adapted for alternate rotation, and the cams whereby the weight may be transferred from the nuts while being rotated, in the manner set forth and described.

5. The combination, in a lifting-jack, of the central screw-bar, the screw-nuts provided with a ratchet-wheel, and the cams arranged to raise the weight and simultaneously turn the nuts, for the purpose shown and described.

6. In a lifting-jack, the frame A, provided with a disk having an aperture through it, the upper side of said disk adapted to form a bearing, the lower nut adapted to rest on said bearing, and the central screw-bar, the said nut having on its periphery ratchet-teeth for the rotation of the same, all combined and arranged to operate in the manner shown.

7. In a lifting-jack, the combination of the central screw-bar, the upper nut having on its upper edge a collar, on its lower side a ratchet-wheel, and a casing having gudgeons and inclosing said nut, the gudgeons being adapted to receive a pair of friction-wheels, in the manner shown and set forth.

8. The frame A, having a cup-shaped recess in its upper portion, a nut fitting said recess, gudgeons $t\ t$, projecting from and fastened to said frame, the cams L L, working on said gudgeons, and the spring-lever F, working through said cams, whereby the rotation of the cams will also rotate the nut, in the manner and for the purpose described.

9. The combination, in a lifting-jack, of the frame A, nuts C D, cams L, and rollers K, and the bifurcated lever H, combined and arranged for joint operation in the manner shown.

10. The combination, in a lifting-jack, of the central screw-bar, the ratchet-wheeled nuts, and the rings $j$, provided with clutches for the reception of the pins $v$, said rings adapted to carry the pawls by which the nuts are turned, as shown and set forth.

In testimony whereof I affix my signature in presence of two witnesses.

GILBERT R. ELLIOTT.

Witnesses:
  MILTON CLARK,
  HOWARD S. WHEELOCK.